Nov. 18, 1930.   F. M. HUPP   1,782,350
STOCK WATERER
Filed Dec. 28, 1929   2 Sheets-Sheet 1
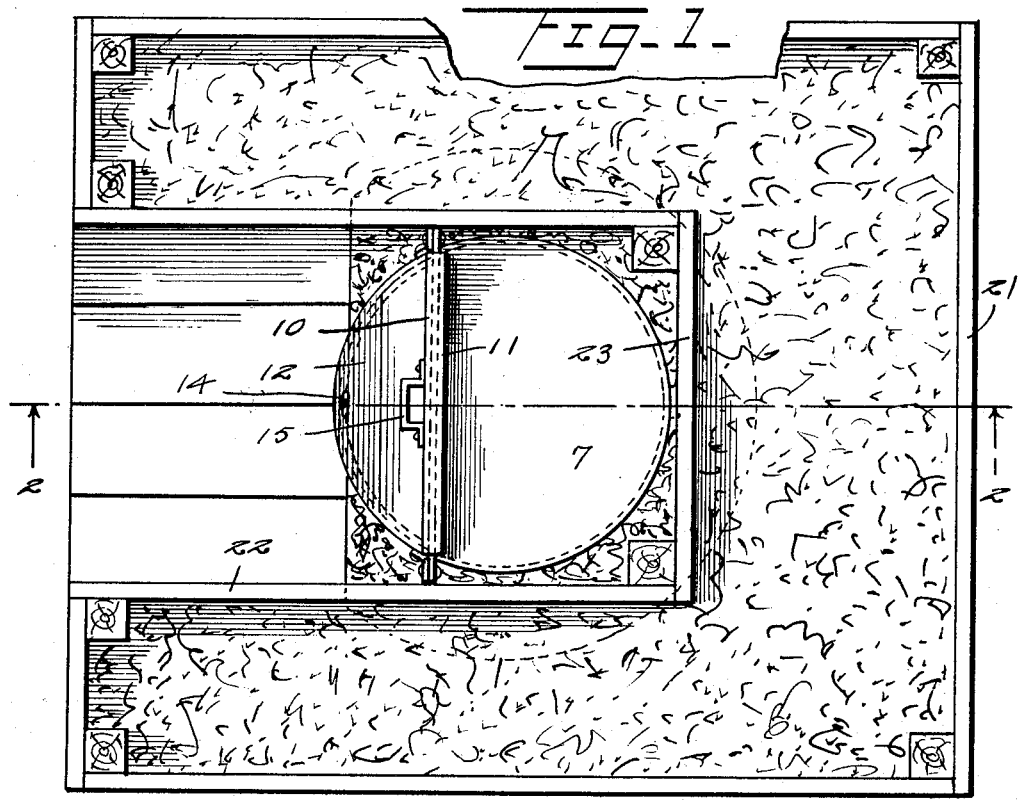
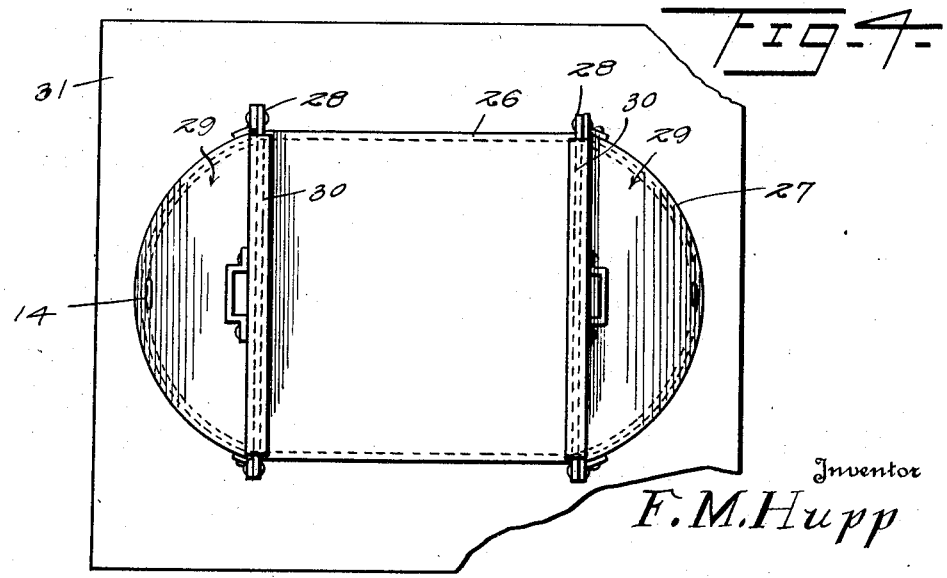
Inventor
F. M. Hupp
By Watson E. Coleman
Attorney

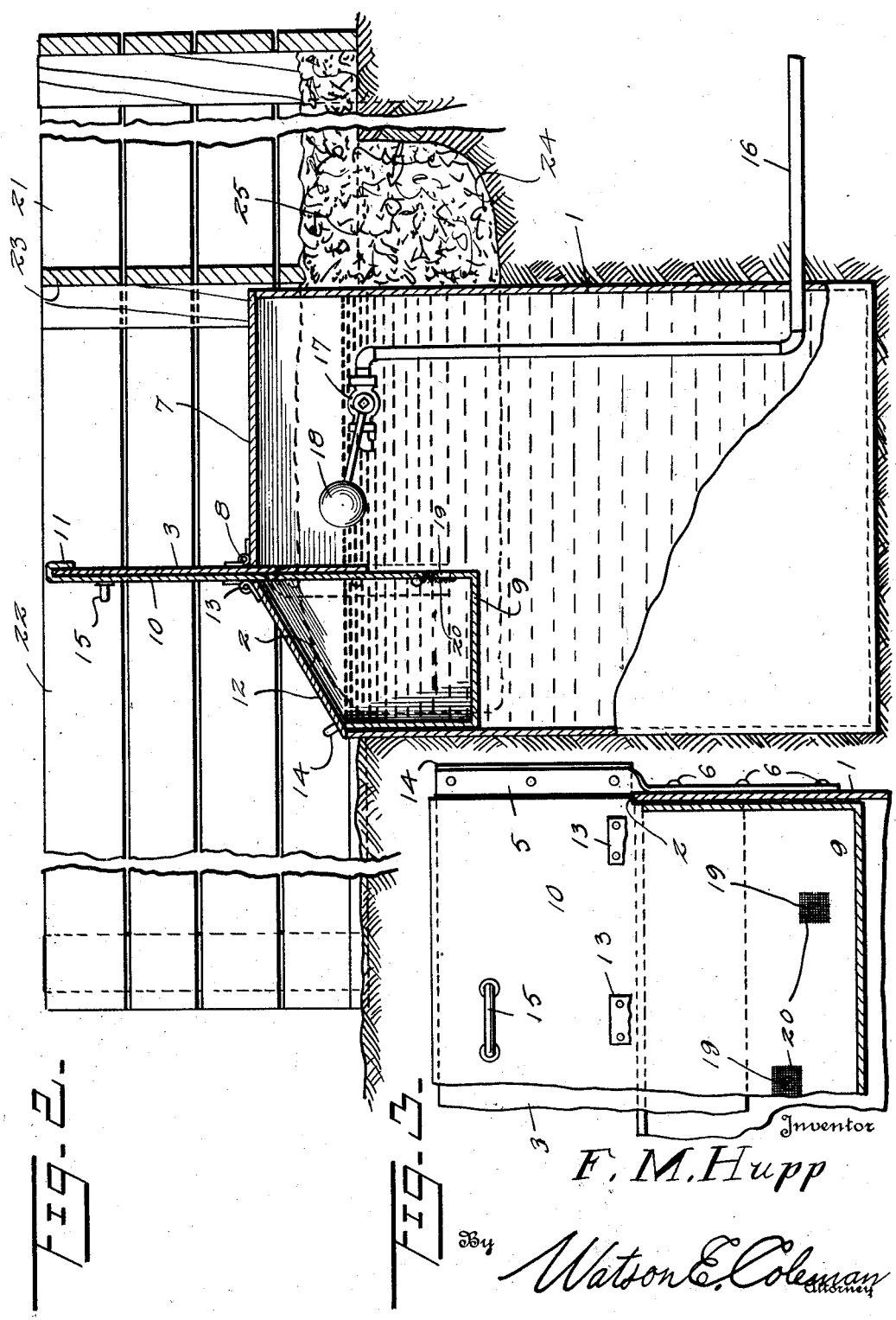

Patented Nov. 18, 1930

1,782,350

UNITED STATES PATENT OFFICE

FERDINAND M. HUPP, OF CLEARWATER, NEBRASKA

STOCK WATERER

Application filed December 28, 1929. Serial No. 417,158.

This invention relates to improvements in stock watering devices, the present device being designed primarily for use as a hog waterer.

The primary object of the present invention is to provide a hog waterer so constructed that the contents thereof will not freeze thus making it possible to supply animals with water therefrom during the coldest winter weather.

Another object of the invention is to provide a hog waterer so designed as to trap dirt and sand to prevent the same from entering the main tank where the drinking water is stored, the animals drinking from a small removable trough in which the dirt settles.

The invention will be best understood from a consideration of the following detailed description taken in connection with the accompanying drawings forming part of this specification, with the understanding however, that the invention is not confined to any strict conformity with the showing of the drawings but may be changed or modified so long as such changes or modifications mark no material departure from the salient features of the invention as expressed in the appended claims.

In the drawings:—

Figure 1 is a view in top plan of the animal waterer embodying the present invention.

Figure 2 is a sectional view of the same.

Figure 3 is a view partly in front elevation and partly in section of a portion of the upper part of the water tank.

Figure 4 is a view in top plan of a slightly modified form of the invention.

Referring more particularly to the drawings wherein like numerals of reference indicate corresponding parts throughout the several views, the numeral 1 indicates generally a tank preferably of circular construction which is of substantial depth, preferably about six feet. As shown, the major portion of this tank is buried in the ground so that a relative small part at the upper end projects above the ground.

The top edge of the tank from a point at one side of the radial center thereof is cut down to provide the sloping edge portion 2, the lowest point of this edge being disposed in relatively close proximity to the ground in which the tank is sunken.

Extending transversely of the top of the tank 1 between the high points of the inclined edge 2 is a fixed wall plate 3 which, as shown in Figure 2, extends downwardly into the tank a substantial distance and also projects upwardly above the same. This wall plate 3 above the top of the tank is extended laterally as shown in Figure 3 and indicated by the numeral 4 and has secured across one face of each of these lateral projections a strap iron bar 5 which is twisted intermediate its ends to extend downwardly against the outer side of the tank wall to which it is secured as indicated at 6.

To the back of the plate 3 a lid 7 is hingedly attached as indicated at 8 which lid covers the main portion of the top of the tank.

Designed for insertion into the tank between the wall plate 3 and the area of the wall defined by the inclined edge 2 is a receptacle 9 which constitutes the drinking trough, the back wall of this receptacle being extended upwardly as indicated at 10 to position against the forward face of the wall plate 3 in the manner shown.

The top edge of the back wall 10 of the receptacle is turned over to form a flange 11 which receives the top edge of the wall plate 3 and thus serves to maintain the trough 9 in place. The forward wall of the trough 9 is curved to conform to the curvature of the adjacent portion of the end walls and is also inclined to conform to the adjacent top edge of the top wall.

A cover 12 is hingedly attached to the receptacle wall 10 as indicated at 13, this cover being provided, as shown, to close the drinking receptacle. A handle 14 is provided on the cover 12 and another handle is provided to facilitate lifting the trough from position in the tank, the second handle being secured to the face of the extended portion of the back wall of the trough as indicated at 15.

In addition to serving to assist in lifting the receptacle 9 from the tank this handle also acts to prevent the lid or cover 12 from being left standing open, it stopping the opening movement of the lid in such a position that when the lid is released it will fall to closed position.

A water supply pipe 16 is led into the lower part of the tank 1 from a suitable source of supply and extends upwardly therein to a point adjacent the top thereof where it is provided with a valve 17 controlled by a float 18.

The back wall of the drinking receptacle 9 is provided with a pair of apertures 19 each of which is covered by a screen 20 which prevents the passage of dirt from the receptacle 9 into the tank. These apertures permit water to pass from the tank into the receptacle. The valve and float 17 and 18 are so arranged in the tank that the inflow of water will be cut off as soon as the level thereof reaches the top of the receptacle 9 in the manner illustrated.

In order to prevent the freezing of the water in the upper part of the tank 1 in cold weather there is built up around the tank a small pen indicated generally by the numeral 21, this pen being preferably of rectangular design, the tank being disposed in the center thereof. Through one side of this pen an opening is formed and side walls 22 lead inwardly to and beyond the tank and on opposite sides thereof as shown, these walls which thus form an entrance to the drinking tank being connected at their inner ends to the cross wall 23 which runs across behind the tank.

A relatively deep trench 24 is formed in the ground about the upper part of the tank 1 and this trench is filled with barnyard refuse such as manure and the pen 21 is also partially filled therewith as indicated by the numeral 25. This acts as a warming substance for the upper part of the tank and thus prevents the contents thereof from dropping in temperature to a point below freezing.

In Figure 4 a slight modification of the tank structure shown in Figures 1 and 2 is illustrated, this tank which is indicated generally by the numeral 26 being relatively long and having the ends thereof of arcuate contour as indicated at 27. Adjacent each end a transverse wall plate 28 similar to the plate 3 is located from which is suspended a drinking receptacle 29 through the medium of the upstanding back wall 30, the top edge of which is flanged for engagement over the adjacent wall plate 28 in the same manner as described in connection with Figures 1 and 2. In order to prevent the contents of this tank 26 freezing the same means may be employed as was described in connection with the preferred form, that is an area such as is indicated at 31 may be provided around the tank in which manure or the like may be placed.

Having thus described my invention, what I claim is:—

1. An animal watering device comprising a tank having a portion of the top thereof cut away at an inclination, an upstanding partition wall secured in the upper part of the tank and projecting downwardly thereinto, a receptacle arranged in the tank at the side of the wall adjacent the inclined part thereof, said receptacle constituting a drinking trough and having a back wall extending upwardly and formed to provide a supporting flange engaging over the top edge of the first mentioned wall, means for permitting water to flow from the tank into the receptacle, means for controlling the flow of water into the tank, a hinged cover for the receptacle, and a cover for the remaining part of the tank.

2. An animal watering device comprising a tank having a portion of the top thereof cut away at an inclination, an upstanding partition wall secured in the upper part of the tank and projecting downwardly thereinto, a receptacle arranged in the tank at the side of the wall adjacent the inclined part thereof, said receptacle constituting a drinking trough and having a back wall extending upwardly and formed to provide a supporting flange engaging over the top edge of the first mentioned wall, means for permitting water to flow from the tank into the receptacle, means for controlling the flow of water into the tank, a hinged cover for the receptacle, a cover for the remaining part of the tank, said first mentioned wall having the upper part thereof projecting laterally at each side beyond the tank wall, and a supporting bar secured to each projecting portion of the wall and further secured to the wall of the tank.

3. An animal watering device comprising a tank having a portion of the top thereof cut away at an inclination, an upstanding partition wall secured in the upper part of the tank and projecting downwardly thereinto, a receptacle arranged in the tank at the side of the wall adjacent the inclined part thereof, said receptacle constituting a drinking trough and having a back wall extending upwardly and formed to provide a supporting flange engaging over the top edge of the first mentioned wall, means for permitting water to flow from the tank into the receptacle, means for controlling the flow of water into the tank, a hinged cover for the receptacle, a cover for the remaining part of the tank, said first mentioned wall having the upper part thereof projecting laterally at each side beyond the tank wall, a supporting bar secured to each projecting portion of the wall and further secured to the wall of the tank, and a handle device secured to the upwardly extending back wall of the receptacle designed to facilitate removal of the receptacle and to prevent the cover of the receptacle standing open.

4. An animal watering device comprising a receptacle having outwardly rounded opposed walls, the top edges of said walls being cut down at an inclination, an upstanding fixed wall arranged transversely of the receptacle adjacent each of the rounded walls, a receptacle formed to conform to the curvature of each rounded wall and adapted to extend into the tank and constituting a watering trough, each receptacle having a back wall extended upwardly across the face of the adjacent one of the first mentioned walls, said receptacle wall being formed to engage the upper edge of the adjacent wall for supporting the receptacle in position, a cover for each receptacle, means for permitting water to flow from the tank into each receptacle, and float controlled means governing the admission of water to the tank.

5. An animal watering device, comprising a tank having an open top, a cover overlying the major portion of said top, an upstanding body disposed transversely of the top of the tank and having said cover attached thereto, a receptacle adapted to be inserted into the tank through the uncovered portion of the top thereof, means for transferring liquid from the tank to the receptacle, a cover for the receptacle, and supporting means for the receptacle comprising a continuation of the back wall thereof having a flange at the top edge adapted to engage over said upstanding body.

In testimony whereof I hereunto affix my signature.

FERDINAND M. HUPP.